I. W. SHALER.
Gas-Burner Shade.
No. 107,824.                Patented Sept. 27, 1870.
FIG. 1.
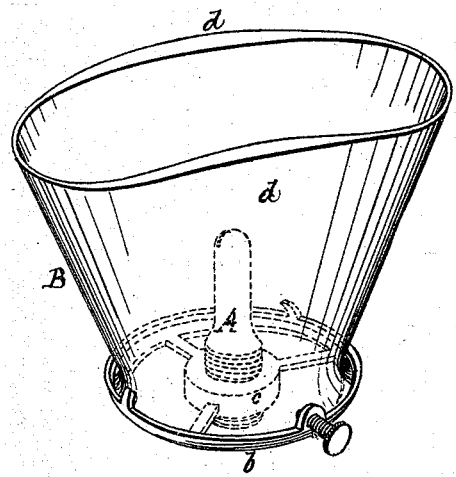
FIG. 3.        FIG. 2.
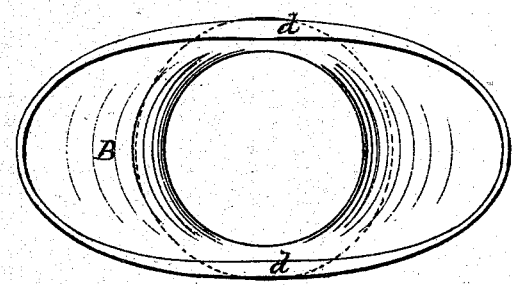 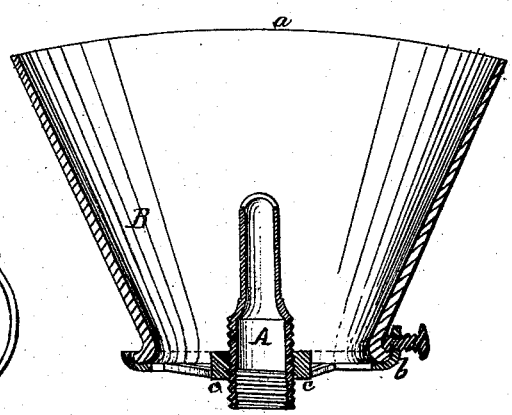

United States Patent Office.

IRA W. SHALER, OF BROOKLYN, NEW YORK.

Letters Patent No. 107,824, dated September 27, 1870.

IMPROVEMENT IN SHIELDS FOR GAS-BURNERS.

The Schedule referred to in these Letters Patent and making part of the same.

*To whom it may concern:*

Be it known that I, IRA W. SHALER, of Brooklyn, in the county of Kings and State of New York, have invented certain new and useful Improvements in Regulating, Steadying, and Intensifying the Flame of Illuminating Gas, of which the following is a specification.

The object of my invention is to intensify and prevent the flickering of the flame of illuminating gas, whether ordinary coal-gas, or gas produced by impregnating air with hydrocarbon vapor; and It relates especially to the burning of such gases in an ordinary "fish-tail" or "bat's-wing" burner.

In the argand burner a round flame is produced, with a central draught; but, while the light is intensified and steadied, there is an intense heat generated, which is oftentimes unpleasant, and the consumption of gas is very great, compared with the ordinary burner, in which a flat broad flame is produced.

My invention, as above stated, is directed to the producing of a better light from a burner of the latter kind; and to this end, It consists in the employment, with the burner, of an adjustable transparent or translucent shield, shaped and constructed as hereinafter specified, so as to properly direct the currents of air upon the flame, and to intensify the light which passes through the shield.

The nature of my invention will be readily understood by reference to the accompanying drawing, in which—

Figure 1 is a perspective view of the burner, with my improved shield applied to the same.

Figure 2 is a longitudinal vertical central section of the same.

Figure 3 is a top view of the glass shield.

The burner A is the ordinary bat's-wing or fish-tail burner, and needs no further description. The flame produced by the gas issuing from the burner is a flat broad flame, in shape approximating that of a fish-tail or bat's wing, whence the burner derives its name, and this flame is very apt, under ordinary circumstances, to flicker, and does not give all the light which might be produced were it properly supplied with oxygen.

To prevent the flickering, and to produce perfect combustion, I employ a shield, B, of glass, or other transparent or translucent material, shaped as shown in the drawing, so as to approximate in form to the shape of the dark or central portion of the flame, which is composed of gas, either unconsumed or in a state of imperfect combustion.

The shield, at its base, is contracted, and of cylindrical form, and it thence widens on two sides toward its upper end, so that its top or mouth shall have an elliptical shape, as shown plainly in figs. 1 and 3, and the upper end of the shield is curved on the longer line *s* of the ellipse, as shown at *a*, fig. 2, so that the central portion of the mouth will be higher than the ends.

The elliptical form of the glass at the top is absolutely necessary to properly shield the flame, and, at the same time, supply it with air; and it is quite as necessary, in order to produce the best results, and to direct the air, so that it may properly impinge against the flame, that the shield should also be drawn in and contracted at its lower end, as shown.

I also find, by careful experiment that a better flame is produced by shaping the top as at *a* than would be the case were the line *a* a straight line.

This shield, when applied to the burner, should be so adjusted that its top should be on about a line with the dividing line between the dark and light portions of the flame, whatever the size of the flame may be, and, to this end, I make it adjustable by employing a holder, *b*, in which the base of the shield is held in the ordinary way, and which is united by arms or a frame with a central socket or sleeve, *c*, having a female screw, which fits a male screw-thread cut upon the burner, as seen in fig. 2.

By means of this screw-adjustment, the shield can be raised or lowered, and accurately adjusted in the position which it should occupy with relation to the flame.

In order to intensify the light, I make the inner and outer surfaces of the sides of the shield convex, as shown at *d*, figs. 1 and 3.

At least one-half of the flame is above the top of the shield, as above stated, and the light is thus generally diffused throughout the room or other place where the burner is used, but the light is also reflected downward through these peculiarly-formed sides of the shield, which act upon the same principle as magnifying-glasses, and serve to intensify and increase the light.

By careful and long-continued experiment, I have found that a burner provided with my improved shield will, with a consumption of from four and one-half to five feet of gas per hour, give as good or a better light than an argand burner consuming eight or nine feet of gas in the same time. The light is perfectly steady also, and the disagreeable flickering noticed in burning gas, especially gas made from hydrocarbon vapor, is entirely prevented.

Having now described my invention, and the manner in which the same is or may be carried into effect, I would state that I am aware that short adjustable chimneys of elliptical shape, of the same size from top and bottom, have been used with gas-burners, and this, therefore, I do not claim; but What I do claim, and desire to secure by Letters Patent, is—

1. An adjustable shield of glass, or other transparent or translucent material, having its body and upper edges, or top, shaped as herein shown and described, in combination with a gas-burner, substantially as and for the purposes set forth.

2. An adjustable shield for gas-burners, having its body and upper edges, or top, shaped as herein specified, and its sides made convex upon their inner and outer surfaces, as and for the purposes shown and set forth.

In testimony whereof I have signed my name to this specification before two subscribing witnesses.

IRA W. SHALER.

Witnesses:
W. BAILEY,
WM. H. MCCABE.